United States Patent [19]
Olson et al.

[11] Patent Number: 4,513,476
[45] Date of Patent: Apr. 30, 1985

[54] APPARATUS FOR PROCESSING POULTRY

[75] Inventors: Harold D. Olson, Smyrna; Charles Addison, Dunwoody; J. Douglas Cagle, Roswell, all of Ga.

[73] Assignee: Cagle's, Inc., Atlanta, Ga.

[21] Appl. No.: 477,269

[22] Filed: Mar. 21, 1983

[51] Int. Cl.³ .............................................. A22C 21/00
[52] U.S. Cl. ...................................... 17/44.1; 17/1 S
[58] Field of Search ............... 17/11, 44.1, 44.2, 44.3, 17/44, 1 S

[56] References Cited

U.S. PATENT DOCUMENTS

| | | | |
|---|---|---|---|
| 2,560,067 | 7/1951 | Bell | 17/11 |
| 2,688,765 | 9/1954 | Sharp et al. | 17/44.1 |
| 2,797,436 | 7/1957 | Shadley | 17/44.1 |
| 2,839,781 | 6/1958 | Jarvis | 17/44.1 |
| 2,942,429 | 6/1960 | Van Dolah et al. | 62/64 |
| 3,092,975 | 6/1963 | Zebarth | 62/63 |
| 3,112,515 | 12/1963 | Volk | 17/11 |
| 3,132,373 | 5/1964 | Altenpohl, Jr. | 17/44.1 |
| 3,474,489 | 10/1969 | Kliewer et al. | 17/11 |
| 3,680,173 | 8/1972 | Martin | 17/44.1 |
| 3,689,958 | 9/1972 | Dillon | 17/11 |
| 3,781,946 | 1/1974 | Altenpohl | 17/44.1 |
| 3,817,167 | 6/1974 | Mosterd | 17/44.1 X |
| 3,895,415 | 7/1975 | Volk | 17/11 |
| 3,946,117 | 3/1976 | Blair et al. | 426/281 |
| 4,071,924 | 2/1978 | Meyn | 17/24 |
| 4,255,831 | 3/1981 | VanGinkel et al. | 17/11 |
| 4,257,141 | 3/1981 | van Brummelen | 17/11 |
| 4,293,977 | 10/1981 | Volk et al. | 17/11 |
| 4,339,847 | 7/1982 | Niccolls | 17/1 |

Primary Examiner—Willie G. Abercrombie
Attorney, Agent, or Firm—Thomas & Kennedy

[57] ABSTRACT

Eviscerated poultry is conveyed upon a shackle through a refrigerated space in a compact configuration for a time sufficient to chill birds so as to cause them to self-retain the compact configuration when delivered to a bird packaging station for packing in the same configuration. The shackle itself has a basket pivotably mounted to a lower portion of a hanger bar and a canopy mounted to an upper portion of the bar.

5 Claims, 5 Drawing Figures

APPARATUS FOR PROCESSING POULTRY

TECHNICAL FIELD

This invention relates generally to methods and apparatuses for processing poultry, and particularly to methods and apparatuses for chilling birds such as young broilers preparatory to packaging as fresh poultry.

BACKGROUND OF THE INVENTION

In poultry processing plants today, where poultry is prepared for sale as fresh produce, birds are killed, eviscerated and chilled prior to being bagged for distribution and sale. The birds are chilled to enhance moisture retention so that they will stay moist when cooked and so that the skin will not tend to separate from the meat for enhanced eatability and cosmetic appearance. The chilling is typically done by dropping eviscerated birds into a tank of cold water for a period of time sufficient to lower the body temperature from some 90° to 98° F. following evisceration, to some 35° to 40° F., depending on their size.

More recently, birds have been chilled to a much lower body temperature, just above their freezing temperature, for the same reasons, i.e. for better moisture retention and skin adherence as well as for improved coloration and shelf life. This has been done by what is known as a crystal pack operation wherein birds are passed through a refrigerated room suspended from shackles following their emergence from the chiller. Within the crystal pack room the birds are subjected to a flow of cold air being blown at high velocities for a period of almost an hour. This operation serves to lower the body temperature of the bird from some 35° to 40° F. following emergence from the chiller to approximately 29° F. with the skin of the bird being approximately at $28\frac{1}{2}$° F. At this temperature the birds are very close to but are not actually frozen although moisture on the skin of the bird will have crystallized. As previously stated, this crystal pack operation serves to enhance shelf life of the birds and also to enhance the birds cosmetically. Particularly, this form of chilling renders the bird more yellowish due to the fast rate of heat removal. Again, better moisture retention is also achieved as is skin to meat adherence.

Though the just described crystal pack operation has provided the just described advantages it is not done so without creating certain disadvantages of its own. Probably the most important disadvantage associated with crystal pack operations has to do with the difficulty of modeling or shaping the birds for insertion into a packaging bag for shipment and distribution. Prior to the use of the crystal pack operation the temperature of the birds was only reduced to some 35° to 40° F. At this temperature the birds, which are typically young broilers of some seven to eight weeks of age, are still sufficiently pliable or flexible so as to enable workers to form or truss them into a compacted configuration which sometimes in the industry is referred to as a "butterball" shape. In this configuration the thighs of the birds are raised up against the bird breast with wings usually tucked in between the thighs. With the use of the crystal pack operation, however, the temperature of the birds has been reduced over a substantial period of time almost to a body frozen temperature prior to bagging. This causes the birds to be stiff due to their cold body temperature and the effects of rigor mortis. It thus is difficult to shape or model the birds into the compact, butterball position during the packaging operation. This is particularly true in view of the fact that the birds are suspended invertedly from shackles in a stretched-out position as they are conveyed through the crystal pack room. This stretched out position is, of course, just the opposite of the compacted, butterball position. In addition, in the invertedly suspended position the birds take different orientations such, for example, with one or both wings draped downwardly or at some inclined angle. This leads to variations in time required to bag the birds which are being delivered to the packaging station at regular intervals. The inverted conveying position also leads to weepage during crystal pack operation wherein moisture may be lost from the surface of the skin.

Accordingly, it is seen that a need remains for overcoming the just described problems associated with the use of crystal pack operations in the processing of poultry for sale as fresh produce. It is to the provision of a solution to the just described problem that the present invention is primarily directed.

SUMMARY OF THE INVENTION

In one form of the invention a method of processing poultry comprises the steps of mounting a bird upon a shackle modeled such that the shackle holds the bird in a trussed position with the wings tucked in between the thighs and the thighs pressed against the breast. The bird is conveyed through a refrigerated space for a period of time sufficient to chill the bird so as to cause it to self-retain the trussed position. The birds are then dismounted from the shackle and bagged while still sufficiently chilled to retain substantially the trussed position.

In another form of the invention a method of chilling poultry preparatory to packaging as fresh produce comprises the steps of mounting a bird in a compact position to a shackle of the type having a basket and a canopy located above the basket with the breast supported in the basket, the thighs pressed against the breast, the hocks held in by the canopy and the wings tucked in between the thighs. The bird is conveyed while mounted in the compacted position to the shackle through a refrigerated space for a period of time sufficient to chill the bird so as to cause it to self-retain the compacted position at least briefly when dismounted from the shackle whereby it may then be packaged in the compact position.

In another form of the invention a shackle for conveying poultry in a compact configuration comprises an upright hanger bar, a basket pivotably mounted to a lower portion of the hanger bar for movement between a generally horizontal, bird supporting, raised position and a generally vertical, bird dumping, lowered position. The shackle has a canopy mounted to an upper portion of the hanger bar above the basket for holding an upper end of a bird supported on the basket, and latch means for releasably holding the basket in the raised position.

In still another form of the invention a shackle for conveying poultry comprises an upright hanger bar, a swing arm pivotably mounted to a lower end of the hanger bar and having a step formed in its upper surface so as to define a catch, and a basket mounted to the swing arm. The shackle also has a latch bar positioned aside the hanger bar supported upon the swing arm upper surface for movement into and out of engagement with the catch upon pivotable movements of the swing arm, and means for guiding movement of the latch aside the hanger bar.

In yet another form of the invention apparatus for supporting, conveying and discharging a bird in a trussed configuration comprises a hanger bar, a lower support upon which the bird breast may be cradled pivotably mounted to a lower portion of the hanger bar for movement between a bird supporting position and a bird discharging position, and an upper support mounted to an upper portion of the hanger bar spaced from the lower support a distance such as to retain the hocks of a bird supported upon the support in the bird supporting position but too great a distance to retain the hocks of the bird supported upon the lower support in the bird discharging position. The apparatus also has means for releasably latching the lower support so as to hold the lower support in the bird supporting position.

DETAILED DESCRIPTION

Figure 1:
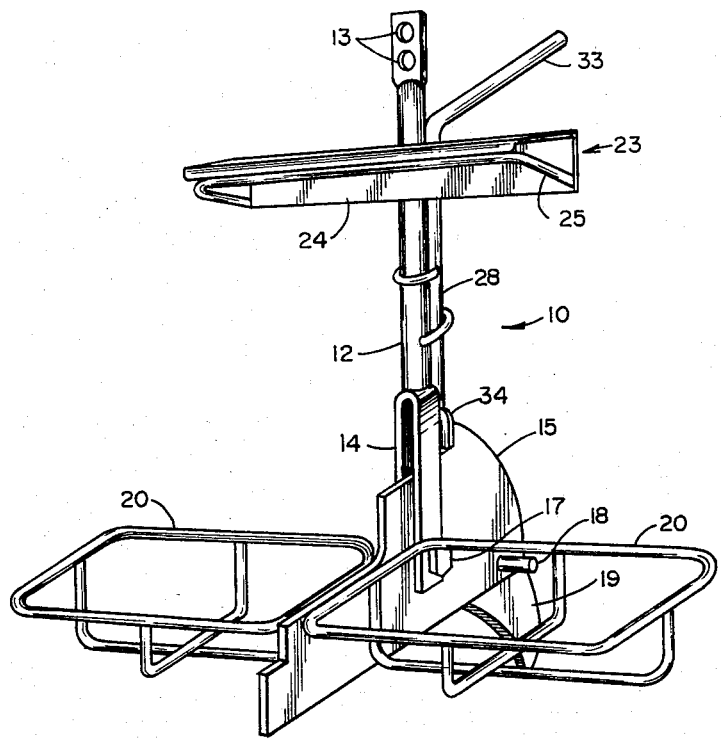
FIG. 1 is a perspective view of a shackle embodying principles of the present invention.

With reference to the drawing there is shown in FIG. 1 a shackle 10 having an upright hanger bar 12. The top of the hanger bar is formed with a pair of holes 13 so that it may be secured by bolts to a conveyer line carriage while the bottom of the bar is formed with a fork 14. A swing arm 15 is pivotably mounted to the hanger bar fork 14 by a bolt 17. A stop pin 18 is mounted to a swing arm to limit its pivotable movement to that position shown in FIG. 4 where it contacts the hanger bar fork. A counterweight 19 is secured to, or formed unitarily with, the swing arm to cause the swing arm to assume the horizontal position shown in FIGS. 1–3 when the shackle is unloaded. Two baskets 20 are mounted to the swing arm with one basket extending laterally to one side of the arm and the other extending laterally to the other side.

A canopy 23 is mounted to the hanger bar 12 spaced from the baskets 20 a distance such as to support the hocks of poultry being invertedly supported in the baskets. This distance will, of course, depend on the type and size of the birds being processed. The canopy includes an inverted L-shaped plate 24 to which a U-shaped bar 25 is secured as by welding.

Finally, a latch bar 28 is loosely mounted aside the hanger by means of two half-rings 29 and 30 secured to the hanger bar through which the latch bar passes and another half-ring 31 secured to the latch bar through which the hanger bar passes. An upper portion of the latch bar is formed with a lift arm 33 while the lower end is formed with a tongue 34. This tongue slidably rest upon an edge of the swing arm 15 for seating engagement in a catch 36 provided by a notch in the edge of the swing arm.

Figure 2:
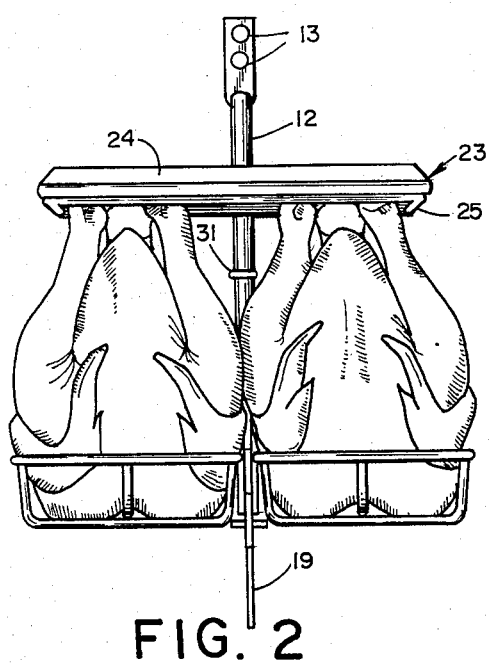
FIG. 2 is a front view of the shackle shown in FIG. 1 loaded with two birds.
Figure 3:
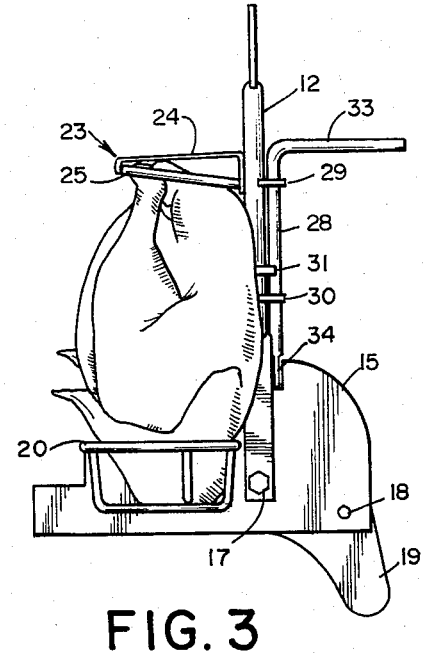
FIG. 3 is a side view of the loaded shackle shown in FIG. 2.
Figure 4:
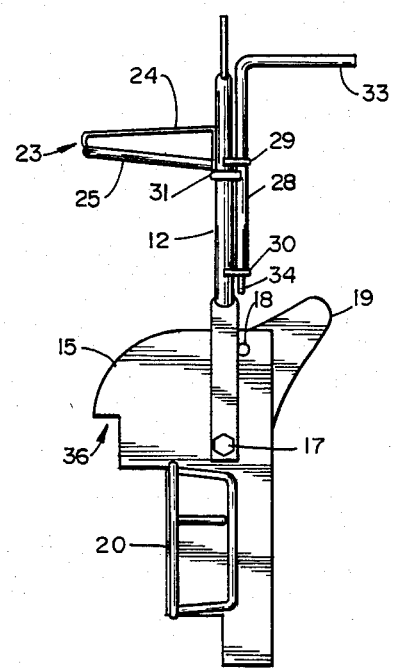
FIG. 4 is an unloaded side view of the shackle shown in FIG. 1 illustrated in a bird discharge position.
Figure 5:
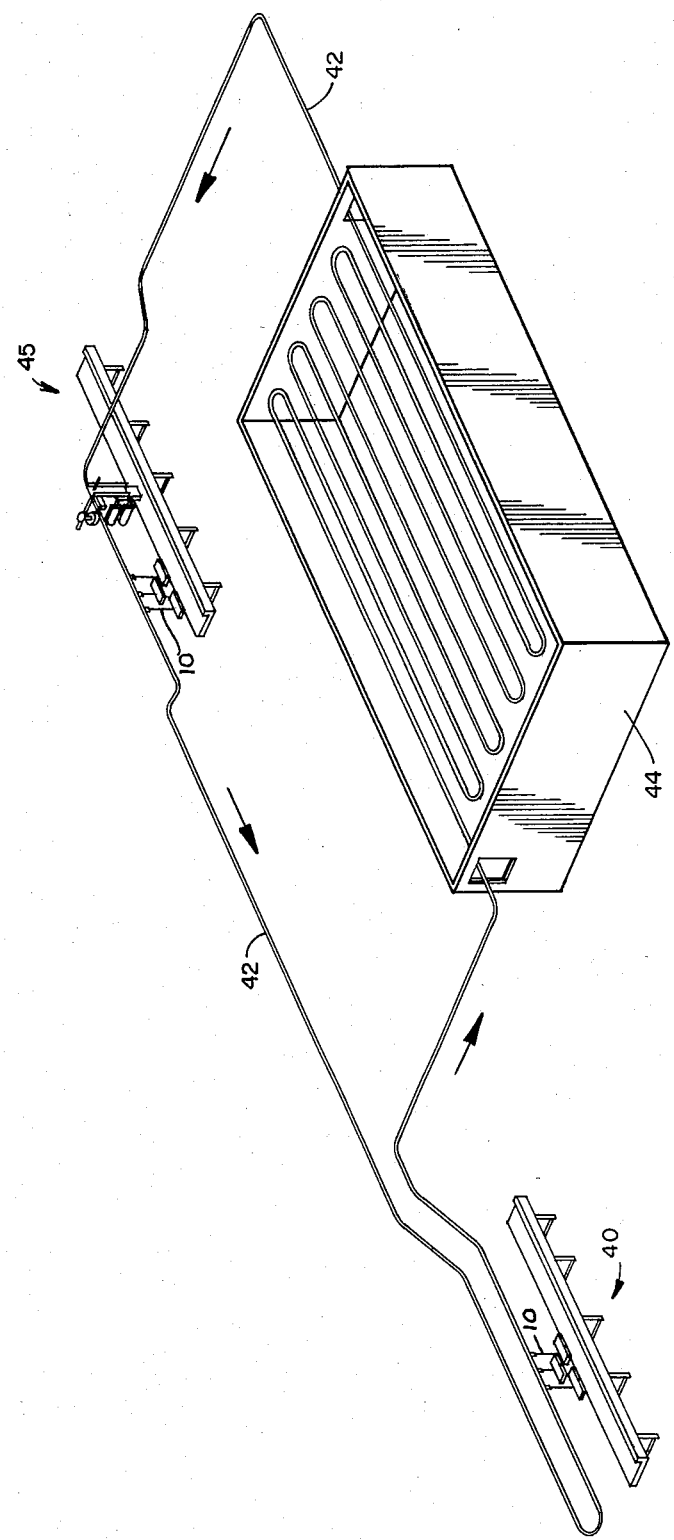
FIG. 5 is a schematic illustration of a poultry processing line that extends through a chill pack room.

In operation two birds are loaded upon a shackle at a loading station 40, as shown in FIG. 5, in an inverted compacted, butterball shape as shown in FIGS. 2 and 3 with the breasts resting in the shackle baskets 20 and the hocks held within the confines of the canopy 23. The loaded shackle is then conveyed by conveyer 42 into a crystal pack room 44 in which air is circulated at a temperature of some 0° F. The shackle and birds are moved along a serpentine route in the crystal pack room for approximately 55 minutes whereupon the body of the birds reach a temperature of approximately 29° F., where the birds are eight-week old broilers, and the skin a temperature of about 28½° F. The shackle and birds then emerge from the crystal pack room and are conveyed to a packing station 45 where they are discharged. Here, discharge is automatically effected by lift arm 33 engaging a cam bar which causes the latch bar to rise along side of the hanger bar thereby bringing tongue 34 out of catch 36. When this occurs the swing arm rotates, under the weight of the birds, to the vertical, discharge position shown in FIG. 4 and the birds fall from the baskets 20. To insure that they do fall free, and are not held to the baskets as by frozen adherence, rotating paddles may be also employed to knock the birds free. Once the birds have fallen from the shackle the baskets are automatically raised by counterweight 19, the latch bar dropped into the catch by disengagement from the cam bar, and the unloaded shackles conveyed to the loading station 40.

When the birds are discharged from the shackle and conveyer at the pack station, they are in the butterball shape. A worker may therefore easily bag them in this same configuration for sale at retail. And since they have been in this shape during their transit through the crystal pack room they have not been subjected to substantial weepage.

It should be understood that the just described embodiment merely illustrates principles of the invention in one preferred form. Many modifications, additions and deletions may, of course, be made thereto without departure from the spirit and scope of the invention as set forth in the following claims. 9n

What is claimed is:

1. A shackle for conveying previously eviscerated, decapitated oven-ready poultry in a compact configuration comprising, in combination, an upright hanger bar; a basket sized and shaped to form a surface support for the carcass of a bird in an inverted attitude, said basket being pivotably mounted to a lower portion of said hanger bar for movement between a generally horizontal bird supporting raised position and a generally vertical bird-dumping lowered position; a canopy mounted to an upper portion of said hanger bar above said basket at a distance approximately corresponding to the length of the carcass of the bird for engaging the hocks of the bird and holding the thighs of the bird folded against the breast of the bird and holding an upper end of a bird supported upon the basket; and latch means for releaseably holding said basket in said raised position.

2. A shackle of claim 1 wherein said latch includes an inverted L-shaped bar mounted for slideable movement aside said hanger bar.

3. The shackle of claim 1 wherein said basket is pivotably mounted to said hanger bar by a swing arm to which said basket is rigidly secured.

4. The shackle of claim 3 wherein said latch is provided by a catch formed on said swing arm and the lower end of a bar mounted for slideable movement aside said hanger bar.

5. Apparatus for supporting, conveying and discharging a bird in a trussed configuration comprising a hanger bar, a lower support upon which the bird breast may be cradled pivotably mounted to a lower portion of said hanger bar for movement between a laterally extending bird supporting position and a downwardly extending bird discharging position; an upper laterally extending support positioned over said lower support when said lower support is in its laterally extending position, said upper laterally extending support being mounted to an upper portion of said hanger bar and being spaced from said lower support a distance to retain the hocks of a bird supported upon said lower support in said bird supporting position but a distance too great to retain the hocks of the bird supported upon said lower support in said bird discharging position; and means for releaseably latching said lower support so as to hold lower support in said bird supporting position.

* * * * *